US010024077B2

(12) United States Patent
Witherspoon et al.

(10) Patent No.: US 10,024,077 B2
(45) Date of Patent: Jul. 17, 2018

(54) LOW-PROFILE SNAKE BARRIER

(71) Applicant: ATROX SNAKE BARRIER, LLC, Dallas, TX (US)

(72) Inventors: William V. Witherspoon, Grand Prairie, TX (US); Eric C. Pyhrr, Midlothian, TX (US); Johnny Dickson, Prosper, TX (US); Brett Blair, McKinney, TX (US)

(73) Assignee: Atrox Snake Barrier, LLC, Dallas, TX (US)

( * ) Notice: Subject to any disclaimer, the term of this patent is extended or adjusted under 35 U.S.C. 154(b) by 36 days.

(21) Appl. No.: 15/017,232

(22) Filed: Feb. 5, 2016

(65) Prior Publication Data
US 2017/0226770 A1    Aug. 10, 2017

(51) Int. Cl.
*E04H 17/06*    (2006.01)
*A01K 1/00*    (2006.01)
(Continued)

(52) U.S. Cl.
CPC .......... *E04H 17/063* (2013.01); *A01K 1/00* (2013.01); *A01G 13/105* (2013.01); *E04H 17/003* (2013.01); *E04H 17/18* (2013.01)

(58) Field of Classification Search
CPC ..... A01G 13/10; A01G 13/105; A01M 23/02; A01M 23/08; E04H 17/003; E04H 17/04; E04H 17/06; E04H 17/16; E04H 17/18; Y10T 403/32016; Y10T 403/32221; Y10T 403/32606; F16B 5/02
(Continued)

(56) References Cited

U.S. PATENT DOCUMENTS 1,764,284 A    6/1930    Barton
2,517,386 A    8/1950    Cooper
(Continued)

FOREIGN PATENT DOCUMENTS

DE    2945292 A1    5/1981
GB    2095962 A    10/1982
(Continued)

OTHER PUBLICATIONS

International Search Report and Written Opinion in International Patent Application No. PCT/US2017/015722, dated Apr. 12, 2017, 15 pages.

*Primary Examiner* — Josh Skroupa
*Assistant Examiner* — Cory B Siegert
(74) *Attorney, Agent, or Firm* — Foley & Lardner LLP

(57) ABSTRACT

A low-profile snake barrier includes a plurality of sections that form a boundary. One section of the plurality of sections includes a screen-type material that is supported by a first support brace at a first end of the one section and a second support brace at a second end of the one section opposite the first end. The support braces support the screen-type material in a collapsed configuration and an erect configuration, where the erect configuration includes an upright portion of the screen-type material extending upward from the ground and an overhang portion of the screen-type material extending from the upright portion. In the collapsed configuration, the upright portion and the overhang portion are parallel to the ground. Each support brace include pivotably coupled members.

21 Claims, 17 Drawing Sheets

(51) Int. Cl.
*A01G 13/10* (2006.01)
*E04H 17/00* (2006.01)
*E04H 17/18* (2006.01)

(58) Field of Classification Search
USPC ......... 256/1, 25, 26, 32, 45; 403/54, 79, 119
See application file for complete search history.

(56) References Cited

U.S. PATENT DOCUMENTS

| | | | |
|---|---|---|---|
| 2,835,223 A * | 5/1958 | Erickson | A01K 3/00 |
| | | | 119/502 |
| 3,165,853 A | 1/1965 | Ansell | |
| 3,450,187 A * | 6/1969 | Foltz | E06B 11/021 |
| | | | 160/328 |
| 4,286,405 A | 9/1981 | Howard | |
| 4,301,996 A * | 11/1981 | Holyoak | A01G 13/105 |
| | | | 256/1 |
| 4,319,423 A * | 3/1982 | Judd | A01G 13/105 |
| | | | 43/121 |
| 4,449,316 A | 5/1984 | Moorhead | |
| 4,489,516 A | 12/1984 | Moorhead | |
| 4,566,219 A | 1/1986 | Firth | |
| 5,063,876 A * | 11/1991 | Harris | A01K 3/00 |
| | | | 119/513 |
| 5,267,724 A | 12/1993 | Heath et al. | |
| 5,299,781 A * | 4/1994 | Barrett | E04H 17/08 |
| | | | 256/1 |
| 5,638,635 A | 6/1997 | Palladino | |
| 5,934,651 A | 8/1999 | Koljonen | |
| 5,967,089 A | 10/1999 | Allen | |
| 6,206,347 B1 | 3/2001 | Kelley | |
| 6,271,533 B1 | 8/2001 | O'Brien | |
| 6,336,290 B1 | 1/2002 | Callan | |
| 7,562,453 B1 * | 7/2009 | Benner | A01G 13/10 |
| | | | 256/1 |
| 7,640,693 B2 * | 1/2010 | McLemore | A01M 23/08 |
| | | | 43/60 |
| 7,793,920 B2 * | 9/2010 | Bauer | A01M 1/04 |
| | | | 256/45 |
| 8,308,141 B1 * | 11/2012 | Mellins | A01K 3/00 |
| | | | 256/11 |
| 8,402,630 B2 * | 3/2013 | McGinn | A01G 13/105 |
| | | | 29/525.01 |
| 8,540,456 B2 * | 9/2013 | Marshall | B65D 90/24 |
| | | | 405/107 |
| 8,616,531 B2 * | 12/2013 | Hough | A01K 3/00 |
| | | | 256/11 |
| 2008/0277638 A1 * | 11/2008 | Benner | A01K 3/00 |
| | | | 256/11 |
| 2009/0013597 A1 | 1/2009 | Orton | |
| 2009/0152522 A1 | 6/2009 | Underwood | |
| 2009/0159220 A1 | 6/2009 | Henning | |
| 2009/0176067 A1 | 7/2009 | Palley et al. | |
| 2010/0243979 A1 | 9/2010 | Moore | |
| 2012/0068135 A1 | 3/2012 | Lill | |
| 2013/0026432 A1 | 1/2013 | Horvat | |
| 2013/0193393 A1 | 8/2013 | Mellins et al. | |
| 2014/0208643 A1 * | 7/2014 | Inglis | A01G 13/105 |
| | | | 47/33 |
| 2017/0009485 A1 * | 1/2017 | Gentry | E04H 17/18 |
| 2017/0086393 A1 * | 3/2017 | Guigan | A01G 13/105 |

FOREIGN PATENT DOCUMENTS

| | | |
|---|---|---|
| WO | WO-9607312 A1 | 3/1996 |
| WO | WO-2013157923 A1 | 10/2013 |

* cited by examiner

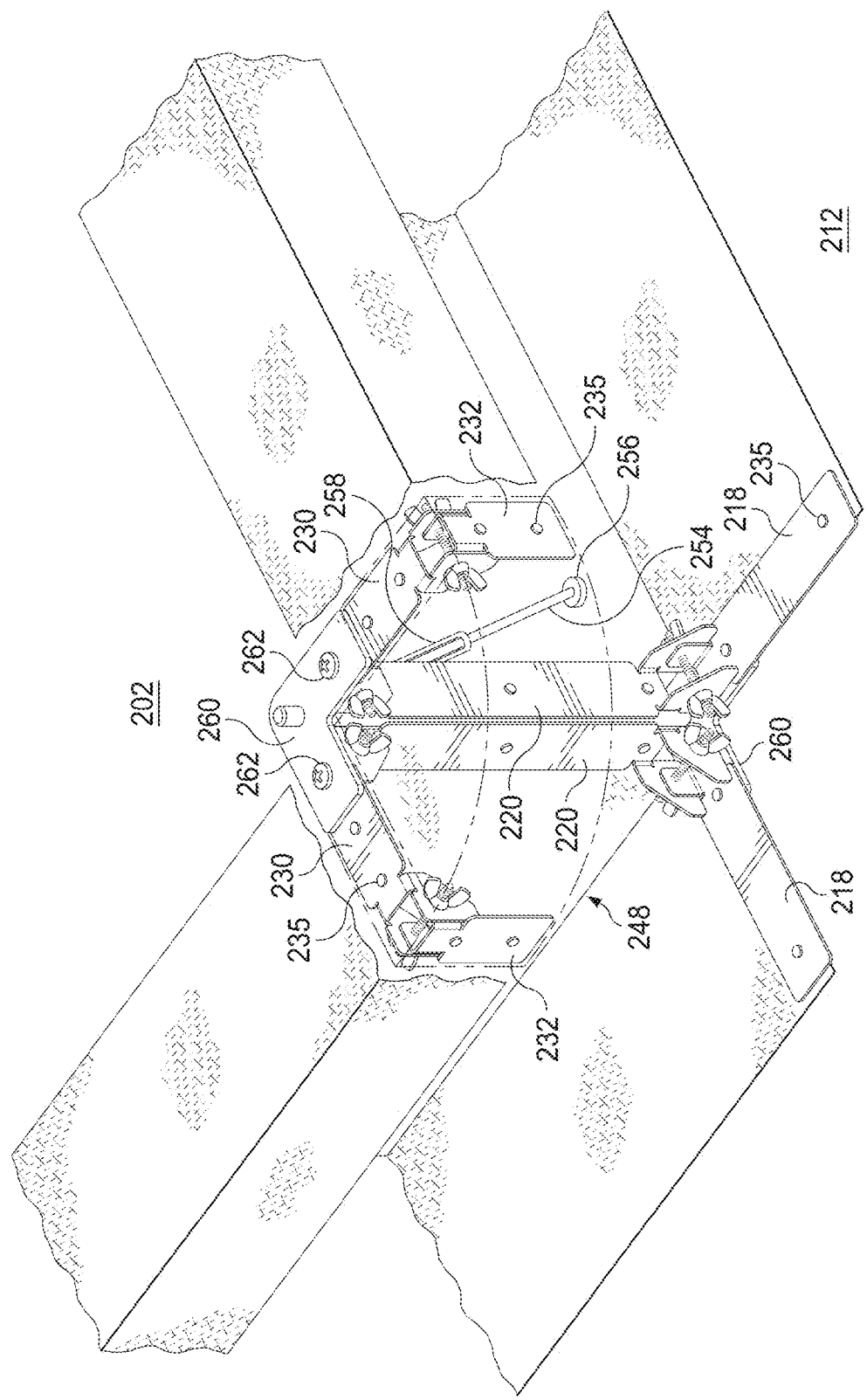

LOW-PROFILE SNAKE BARRIER

CROSS-REFERENCE TO RELATED APPLICATIONS

This application is cross-referenced to related applications U.S. patent application Ser. No. 13/646,096, filed Oct. 5, 2012, now abandoned, which claims the benefit of U.S. Provisional Patent Application No. 61/626,890 filed Oct. 5, 2011, the disclosures of each of which are hereby incorporated by reference in their entirety for all purposes.

TECHNICAL FIELD

This disclosure relates to snake barriers, and in particular, to snake barriers configured to prevent passage of a snake over the barrier.

BACKGROUND

People are inherently afraid of snakes, often because of the stealthy manner in which they live and move around, but more often because many snakes have a deadly bite. Many people cannot differentiate between a venomous snake and a non-venomous snake, and thus are afraid of all snakes. The Crotalid family (pit vipers) of snakes is the most prominent venomous snake in North America and is responsible for most of the human snake bite fatalities. The Crotalid family of snakes includes rattle snakes, copper heads and water moccasins. This type of venomous snake locomotes with their heads low to the ground and are seldom aboralistic, i.e., climb trees or the like. Most snakes have very poor vision and rely on Jacobson organs (smell), heat sensors and vibrations to track and catch prey and avoid predators. It is desirable to create an area of ground where crawling snakes are blocked from reaching.

SUMMARY

In some embodiments, a snake barrier protects an area from entry by snakes. In some embodiments, the snake barrier includes a barrier panel which includes an upright or vertical portion, and a top lateral portion. When installed on the ground around an area to be protected, a snake may approach the barrier and encounter the vertical portion and then crawl around the barrier. The snake may also try to crawl over the barrier, whereupon the top lateral overhang will prevent the snake from entering the protected area over the barrier. The snake barrier is constructed of components that are lightweight, easily assembled at a site to be protected, and thus portable.

According to another embodiment, the barrier can be constructed in sections connected together to form a boundary, which may be in the form of a complete perimeter, around an area of a desired size. The barrier can also be constructed of a flexible screen mesh supported between corner supports and intermediate supports, all of which can be rolled up in a compact roll and carried by a person to a campsite, or the like. The flexible snake barrier can be erected around a door of a tent to prevent snakes from entering the tent.

According to another embodiment, the snake barrier includes at least one section with a height that prevents a snake from crawling on the ground into an area to be protected from snakes. The barrier has an overhang portion that extends outwardly away from the area to be protected from snakes, whereby when a snake attempts to crawl up an upright portion, it is confronted with the lateral overhang and is prevented from crawling over the barrier.

According to another embodiment, the snake barrier includes a flexible screen mesh material providing a perimeter of an area to be protected from snakes. A plurality of corner supports are adapted for anchoring the flexible screen mesh material to the ground, and each corner support has a vertical part, and a top lateral overhang part attached to a top portion of the vertical part, and a bottom ground base part attached to a bottom portion of the vertical part.

DESCRIPTION OF THE FIGURES

Further features and advantages will become apparent from the following and more particular description of the preferred and other embodiments, as illustrated in the accompanying drawings in which like reference characters generally refer to the same parts, functions or elements throughout the views, and in which:

FIG. 5A is a perspective view of a section of the low-profile snake barrier with a pair of support braces in orthogonal abutment;

DETAILED DESCRIPTION

In some embodiments, a snake barrier is erected to block snakes and many other small reptiles and animals from reaching a particular protected area. Snakes, in particular, are deterred when confronted with a snake barrier and are prevented from crawling over even a low-profile snake barrier and into an area desired to be protected. Upon encountering the snake barrier, a snake will reroute its travel around the barrier and be of no consequence to those in the area protected. In other instances, the snake will encounter the snake barrier and attempt to crawl over it, as it would any other routine obstruction in its path. In this latter instance, the snake can crawl upwardly along an upright portion of the snake barrier and then encounter the lateral overhang portion, in which event the snake is again confronted with another barrier, and thus continues its travel to circumvent the obstacle.

The sections of the snake barrier may be bundled in a compact package and transported by a backpack where they may be erected at a campsite around individual tents, around eating areas, play areas, or around the entire camping sites. Moreover, the snake barriers can be installed around homes, pools, gardens, animal shelters, public areas, outside toilet facilities, state and federal parks and recreation areas, picnic areas, etc., and other areas where it is desired to prevent entry of snakes and the like. The snake barriers are portable and may be easily transported from a vehicle to the area to be protected and easily installed, as well as taken down after use. In other situations, the snake barriers can be a permanent structure to provide continued protection. The snake barrier may be erected for form a circular, square, or rectangular protected area.

Figure 1:
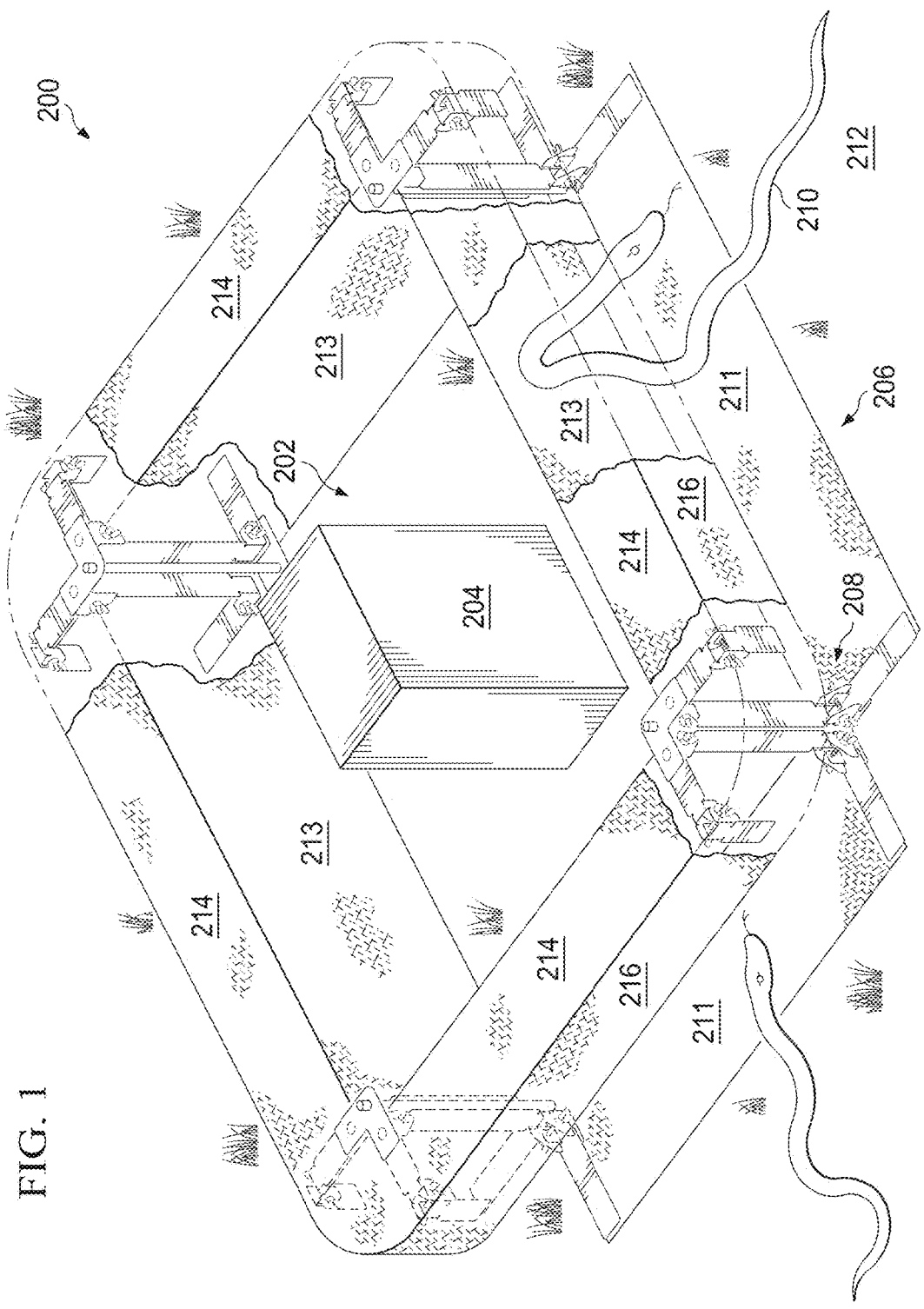
FIG. 1 is an environmental view of a low-profile snake barrier forming a perimeter around a piece of equipment to be accessed by service personnel.

Reference is now made to FIG. 1, which is an environmental view of a low-profile snake barrier 200 according to an embodiment of the present disclosure. The low-profile snake barrier 200 may be erected in a perimeter to form a protected area 202. The protected area 202 may be an area around a transformer 204 or other utility equipment that is periodically accessed by a service person but is most often an unoccupied area. The snake barrier 200 is generally formed of a screen-type or mesh-type of material 206 that is supported and maintained as a barrier by a plurality of support braces 208. The support braces 208 are generally in a shape of a c-shaped channel as described further below.

A snake 210 slithers through an unprotected area 212 toward the protected area 202 and encounters the low-profile snake barrier 200, specifically the snake 210 slithers over a base portion 211 and is blocked by an upright portion 213 of the low-profile snake barrier 200. As described above, the snake attempts to crawl over the barrier but is blocked from breaching the snake barrier 200 by a horizontal overhang portion 214 and a skirt portion 216 and is thus deterred and prevented from further attempting to breach the barrier 200. Thus, the only directions of movement for the snake are either along the snake barrier 200 or to return from the direction it came. In either event, the snake remains in the unprotected area 212 and the protected area 202, whose boundary is formed at least in part by the low-profile snake barrier 200, is free of snakes.

Figure 2A:
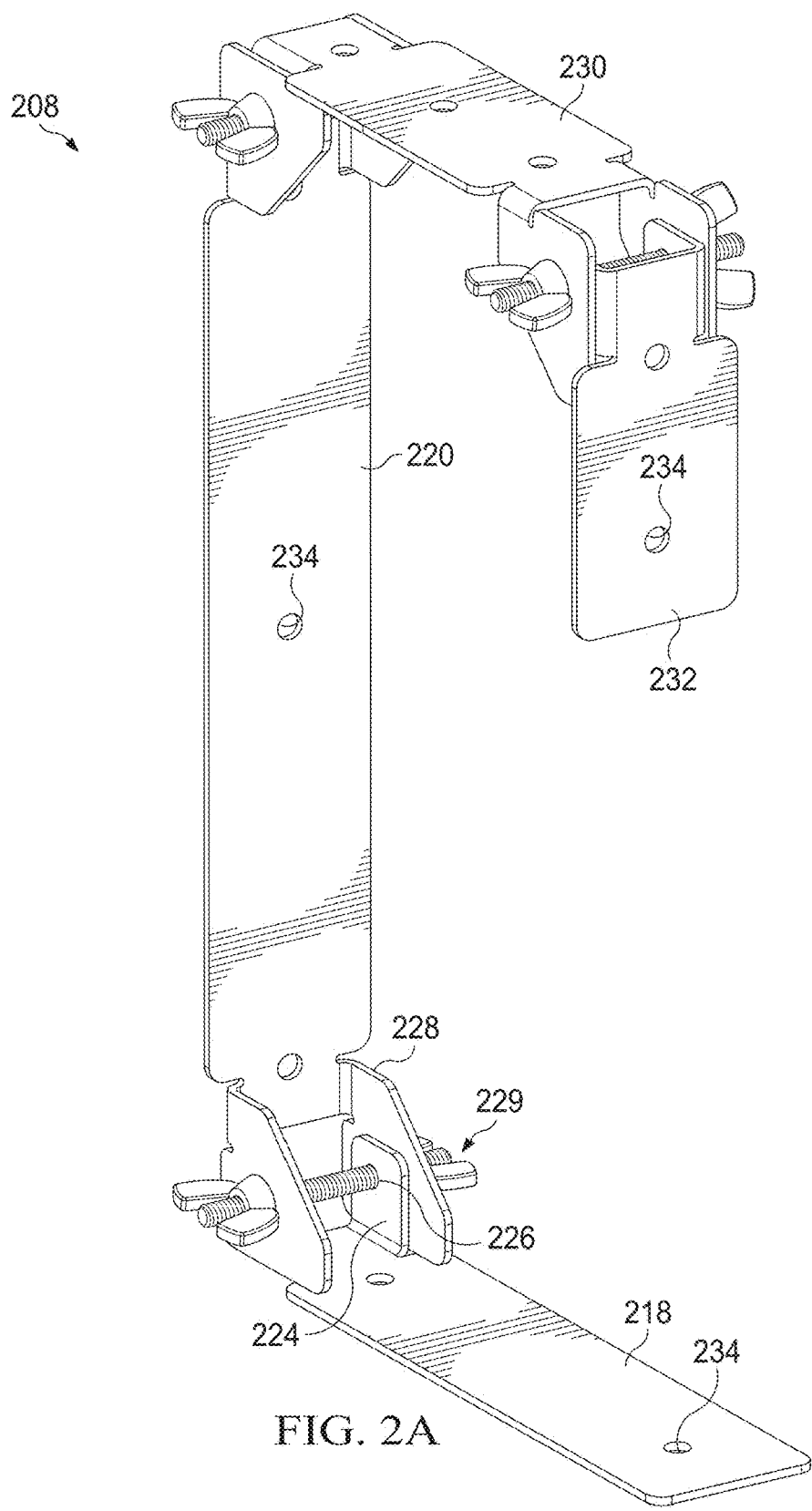
FIG. 2A is a perspective views of an embodiment of a support brace that is adaptable to support an erect configuration of the low-profile snake barrier of FIG. 1.
Figure 2B:
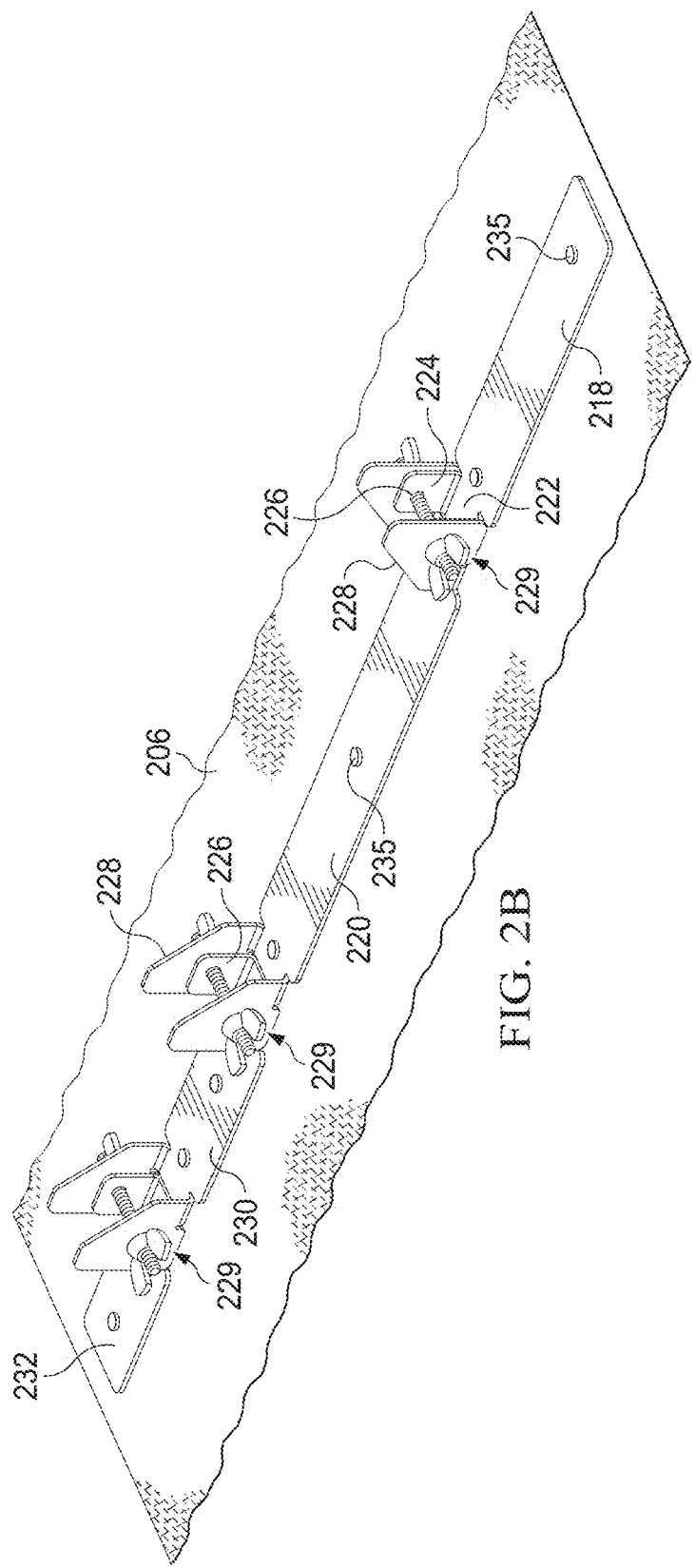
FIG. 2B is a perspective view of the support brace of FIG. 2A in a collapsed configuration.

Reference is now made to FIGS. 2A and 2B, which are perspective views of an embodiment of the support brace 208 according to the teachings of the present disclosure. The support brace 208 generally has a flat-laying position, (also referred to as a lay-flat configuration), as shown in FIG. 2B and an erect position, as shown in FIG. 2A. In the lay-flat position, the support brace 208 is easily shipped and stored. In addition, as described further below, positioning support braces 208 in the lay-flat orientation facilitates assembly of the snake barrier 200. In the erected position shown in FIG. 2B, a plurality of support braces 208 maintains the screen 206 in the barrier configuration shown in FIG. 1.

The support brace 208 includes a base member 218 that is pivotably fastened to a vertical member 220. According to the illustrated embodiment, an end of the base member 218 includes a reduced width portion 222 that supports a pair of tabs 224 where each tab has a through hole 226. An end of the vertical member 220 also supports a pair of tabs 228, each having a through hole 226. A fastener 229, such as a bolt, screw, rivet or any other suitable fastener is received through the holes 226 in the tabs 224, 228, and the members 218, 220 may be tightened in a particular orientation by tightening a nut, for example a wing nut. In this manner, the base member 218 may be secured to the vertical member 220 to allow rotation or pivoting of the members with respect to each other and thereby allow the support brace 208 to be transformed from the lay-flat orientation to the erected orientation and positions in between simply by tightening the fastener 229 in the particular configuration.

An overhang support member 230 also includes a pair of tabs 224 (or alternatively tabs 228) that receives a fastener 229 to pivotably couple the overhang support member 230 to a pair of corresponding tabs 228 disposed at a second end of the vertical member 220. Tightening the fastener 229 facilitates transformation from the lay-flat orientation to the erected orientation of the support brace 208. The overhang support member 230 is pivotably coupled to a skirt support member 232 in the manner described above with respect to the coupling of the vertical member 220 to the base member 218.

A section of the snake barrier 200 may be assembled by positioning a support brace 208 in the lay-flat orientation on the screen/mesh material 206. The screen/mesh material 206 may be formed of any suitable material, such as aluminum or other light-weight metal forming a wire mesh. Alternatively, the screen/mesh-type material 206 may be a polymeric material, such as fiberglass. For example, the screen/mesh material 206 may be a vinyl coated polyester material. The openings in the screen/mesh material 206 may be any suitable size, but they should not be larger than ⅛ inches. According to one embodiment, a screen/mesh material 206 has approximately 23×17 holes per inch. A suitable fastener 235, such as a screw or rivet is received through the screen and through at least one through hole 234 formed in the base member 218 to secure the screen to the base member 218. Similarly, the screen 206 is fastened to the skirt support member 232 using at least one through hole 234 in the skirt support member 232. In addition, in certain embodiments, the screen/mesh material 206 may also be fastened to the vertical member 220 using the through hole 234 formed in the vertical member and the overhang support member 230 using at least one through hole 234 in the overhang support member 230. Once the screen 206 is secured to a support brace 208 the fasteners 229 on the support brace 208 may be tightened to place the support brace 208 in the erected position shown in FIG. 2B. By securing the screen mesh material 206 to a plurality of support braces 208 and joining the support braces together as further described below, a snake barrier, such as the snake barrier 200 shown in FIG. 1 may be erected to create a protected area 202.

The height of the low-profile snake barrier 200 is any suitable height that is at least tall enough to deter and prevent the vertical movement of snakes. In certain embodiments, such as a snake barrier 200 erected at a campsite, the low-profile snake barrier 200 may be short enough to be easily stepped over by an adult camper. For example, the height of the snake barrier 200 may be 6-18 inches tall. It is expected that a snake barrier 200 that is closer to 18 inches tall might be more permanently installed where stepping over the snake barrier 200 is expected to be less frequent than the campsite example. The overhang portion 214 may extend approximately 2-8 inches, for example 5 inches from the upright portion 213. The skirt portion 216 may extend downward approximately 2-8 inch from the overhang portion 214. Also, a section of the snake barrier 200 may be any suitable length provided it maintains its generally c-shape, as illustrated. For example, a section of the snake barrier 200 supported in each end by a support brace 208 may be approximately 3-6 foot long, where a section of the snake barrier 200 that is approximately 6 feet in length may be formed from more rigid material than a 3 foot section.

Figure 3A:
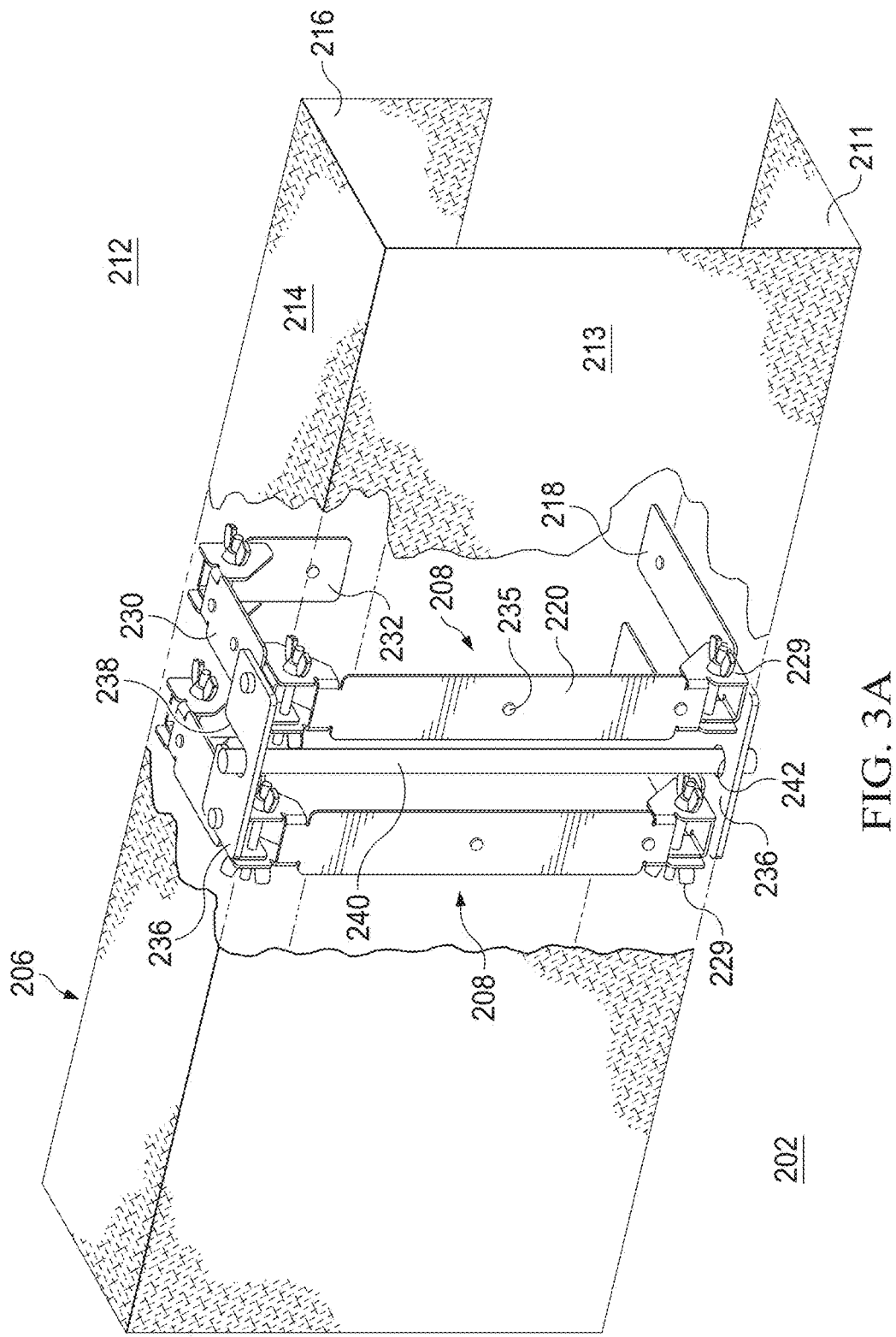
FIG. 3A is a perspective view of sections of the low-profile snake barrier with a pair of support braces in parallel abutment.
Figure 3B:
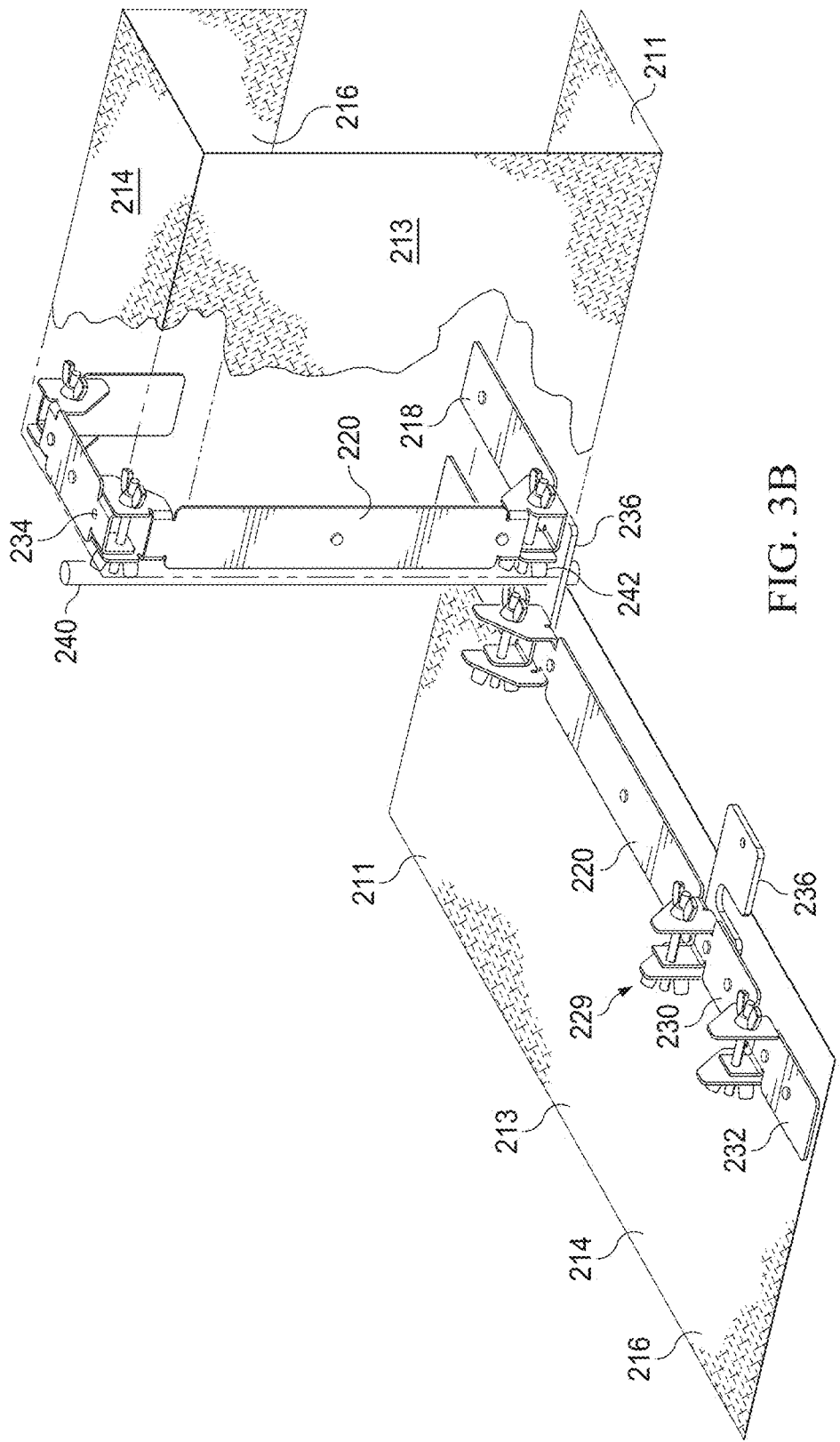
FIG. 3B is a perspective view of the sections of the low-profile snake barrier shown in FIG. 3A with one support brace in a lay-flat configuration to permit driving over a section of the low-profile snake barrier without damaging such section.
Figure 11:
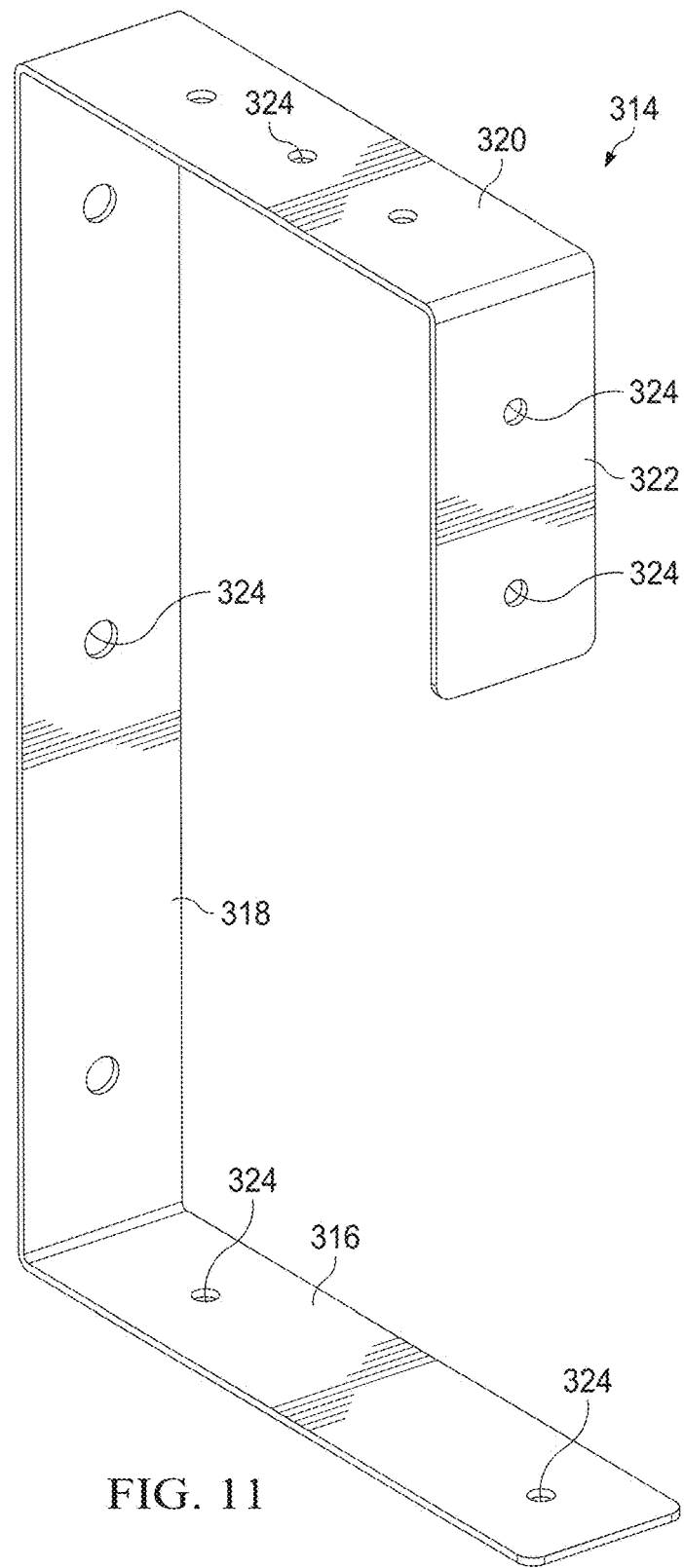
FIG. 11 is a perspective view of an further alternate embodiment of a support brace that is adaptable to support an erect configuration of the low-profile snake barrier.
Figure 12:
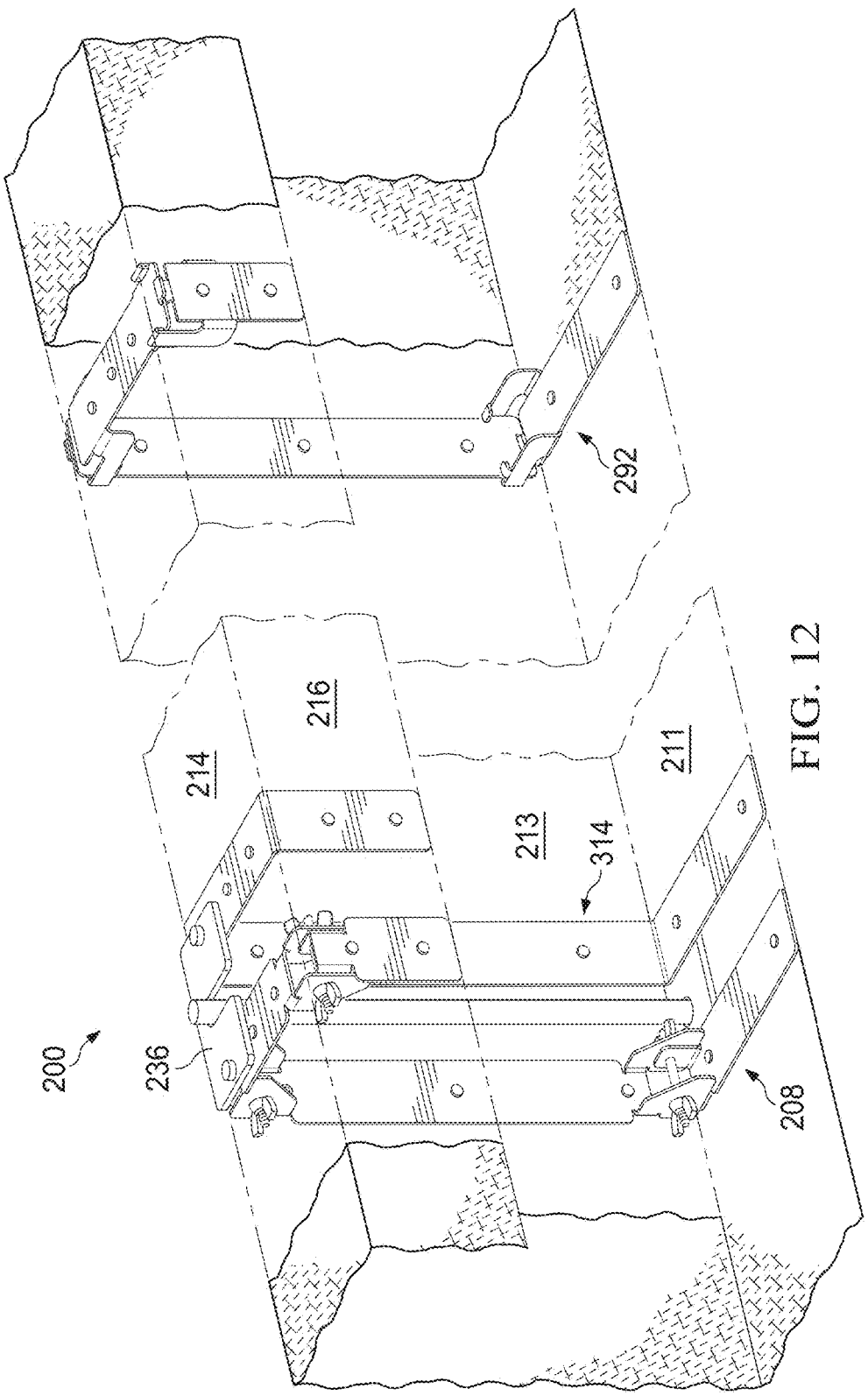
FIG. 12 is a perspective view of sections of a low-profile snake barrier employing multiple embodiments of the support braces according to the teachings of the present disclosure.

Reference is now made to FIGS. 3A and 3B, which illustrate perspective views of a portion of the low-profile snake barrier 200 shown in FIG. 1. The illustrated section includes a pair of support braces 208 in parallel abutment. According to one embodiment, the support braces 208 are collapsible and foldable by loosening the fasteners 229 as described in FIGS. 2A and 2B. According to an alternate embodiment as further described below, one or both of the support braces 314 are fixed, as shown in FIGS. 11 and 12. Each one of the pair of support braces 208 is connected to the other by parallel abutment brackets 236. One of the parallel abutment brackets 236 is secured to the overhang support member 230, and another parallel abutment bracket 236 is secured to the base member 218. Alternatively to what is shown in FIGS. 3A and 3B, the upper parallel abutment bracket 236 may be received between the fastener 229 and overhang support member 230, and the lower parallel abutment bracket 236 may be received between the base member 218 and its lower fastener 229. In this manner, the parallel abutment brackets 236 may be loosely held in place between the fastener 229 and either the overhang support member 230 or the base member 218 such that the stake or the like may be received through the parallel abutment brackets 236 to secure the braces 208 to each other and to the ground.

According to an alternate embodiment, a parallel abutment bracket 236 may be secured to the vertical support members 220. Each of the parallel abutment brackets 236 includes a through hole or a through slot that receives a stake 240. For example, the upper parallel abutment bracket 236 includes a slot 238 to facilitate collapsibility of one of the support braces 208 to allow a section of the low-profile snake barrier 200 to be collapsed, as shown in FIG. 3B. The lower parallel abutment bracket 236 may have a through hole 242 because the two abutted support braces 208 remain connected at the base members 218 even when the section is collapsed.

The stake 240 is received through the upper slot 238 and the lower through hole 242 and is driven into the ground to provide additional support to the support braces 208 in their erected configurations. In addition, a stake, similar to a stake 240 or a tent stake, may be received in place of the rivet by through hole 234 or similar through hole formed in the base member 218. Also, once a section of the low-profile snake barrier 200 is erected and positioned in the desired location to protect the protected area 202, stakes may be driven through the base portion 211 of the screen/mesh material 206 and into the ground. The stakes may be driven into the base portion 211 of the screen/mesh material 206 at any suitable location between the support braces 208.

The parallel abutted support braces 236 allow a section of the low-profile snake barrier 200 to be collapsed while the remainder of the snake barrier 200 remains erect. FIG. 3B shows the collapsed orientation of a section of the low-profile snake barrier 200. In the collapsed orientation, the upright portion 213, the overhang portion 214, the skirt portion 216 of the screen 206 lays flat on the ground with the base portion 211 of the screen. A vehicle or other equipment may be driven or rolled over the collapsed portion of the snake barrier 200 into the protected area 202 without damaging the snake barrier 200. Once the service is performed and the equipment is rolled or driven out of the protected area 202, the collapsed portion may be re-erected and the fasteners 229 tightened in the erected orientation. Also, the slot 238 in the upper parallel abutment bracket 236 is moved to receive the stake 240.

In the fixed support brace embodiment, two fixed support braces 314 (see FIGS. 11-12) or a fixed support brace 314 and a pivotable support brace 208 are joined together using the parallel abutment bracket 236, as shown in FIG. 12. The parallel abutment bracket 236 is fastened to the overhang support portion 320 of each support brace 314. In addition to or in lieu of securing the parallel abutment bracket 236 to the overhang support portion 320, the parallel abutment bracket may be secured to the vertical portions 318 of the support brace 314. Also, optionally, the parallel abutment bracket 236 may be fastened to the base portions 316 of the two support braces 314.

Figure 4:
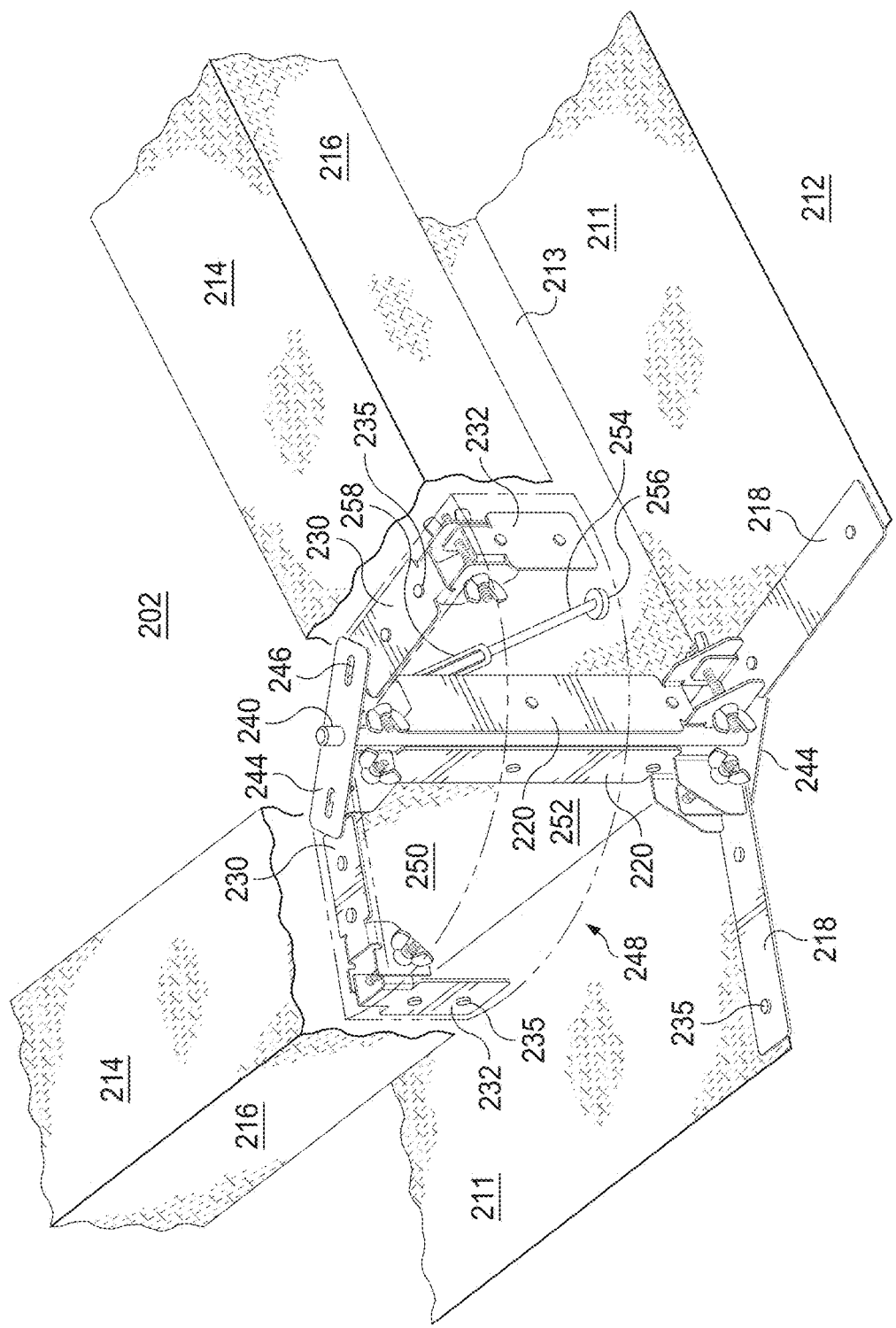
FIG. 4 is a perspective view of sections of the low-profile snake barrier with a pair of support braces in angular abutment.

Reference is now made to FIG. 4, which illustrates a perspective view of a pair of support braces 208 in angular abutment. According to one embodiment, the support braces 208 include the features described above with respect to FIGS. 2A-2B. According to an alternate embodiment described further below, the fixed support brace 314 (see FIGS. 11-12) may be used in place of one or both of the pivotable support braces 208. One support brace 208 is joined to a second adjacent support brace 208 by at least one angular abutment bracket 244. For example, a lower angular abutment bracket attaches to the base members 218 of the adjacent support braces 208. An upper angular abutment bracket 244 is attached to the overhang support members 230 of the adjacent support braces 208. The upper angular abutment bracket 244 includes a pair of slots 246 that align with through holes in the overhang support members 230 when the support braces 208 are oriented at an angle with respect to each other. For example, a pair of fasteners (not shown), for example bolt, screw/nut, rivet, and the like are received through the slot 246 in the angular abutment bracket 244 and the through hole in the overhang support member 230 when the support braces 208 are oriented in an obtuse angle with respect to each other. Alternatively, the fasteners are received through the slot 246 and the hole to secure the support braces at an acute angle with respect to each other. By joining adjacent support braces 208 at various angular orientations, the low-profile snake barrier 200 can be erected in any shape perimeter desired. A stake 240 is received through center holes in the angular abutment brackets 244 to secure the joined support braces to the ground.

A corner screen 248 is supported by the overhang support members 230. For example, a corner screen 248 is secured to the overhang support members 230 using any suitable fastener. A set of fasteners are received through the angular abutment support bracket 244, an overhang portion 250 of the corner screen 248, and the overhang support members 230 of the support braces 208. The corner screen 248 also includes a skirt portion 252 extending downward from the generally horizontal overhang portion 250. The corner screen 248 serves to complete the overhang portion 214 and the skirt portion 216 of the low-profile snake barrier 200 to ensure that there are no gaps at corners or areas where support braces 208 angularly abut each other for a snake to breach the snake barrier 200. Because the support braces 208 are staked to the ground, a base portion of the corner screen may be omitted. Similarly, the support braces 208, specifically the vertical members 220, provide a barrier that substitutes for the upright portion of the screen, so that portion of the corner screen 248 may also be omitted.

To provide additional support for the angular abutment (or the orthogonal abutment described below with respect to FIG. 5A) of the support braces 208, a stabilizing wire 254 may be secured at one end to a part of the joined support braces 208 and the opposite end of the stabilizing wire 254 is coupled to a wire stake 256 that is staked into the ground behind the snake barrier 200 in the protected area 202. In one embodiment, a turnbuckle 258 allows a tension of the stabilizing wire 254 to be adjusted. For example, the stabilizing wire 254 may be secured to the angular abutment bracket 244. The present disclosure contemplates any suitable connection of the stabilizing wire 254 to the angular support bracket 244, the stake 240, or either one or both of the overhang support members 230 of either of the angularly abutted support braces 208.

In the fixed support brace embodiment, two fixed support braces 314 (see FIGS. 11-12) or a fixed support brace 314 and a pivotable support brace 208 are joined together at an angle using an angular abutment bracket 244 secured to the overhang support portions 320, and optionally the base portions 316. The angular abutment bracket 244 is secured to the fixed support brace 314 as described above with respect to pivotable support brace 208.

Reference is now made to FIG. 5A, which illustrates a perspective view of an orthogonal abutment of a pair of support braces 208 to form a corner of the low-profile snake barrier 200 illustrated in FIG. 1. Similar to the angular abutment shown and described with respect to FIG. 4, at least one orthogonal abutment bracket 260 connects the two support braces 208 oriented at a right-angle to each other. For example, a lower orthogonal abutment bracket 260 is attached to the base members 218 of the support braces 208, and an upper orthogonal abutment bracket 260 is attached to the overhang support members 230. A fastener 262 is received through a through hole (or slot) formed in the orthogonal abutment bracket 260 and through a corresponding hole in the overhang support member 230. The lower orthogonal support bracket 260 is attached to the base members 218 in the same manner. A stake 240 is received through center holes of the orthogonal abutment brackets 260, and thereby secures the two support braces 208 in a desired position on the ground. The corner screen 248 is supported by the overhang support members 230 and the skirt support members 232, as described above with respect to FIG. 4. According to an alternate embodiment, a fixed support brace 314 (see FIGS. 11-12) may be used in place of one or both of the pivotable support braces 208. In this embodiment, the orthogonal abutment bracket 260 is secured to the overhang support portions 320 of the fixed support brace 314 and optionally secured to the base portions 316 of the fixed support brace 314.

Figure 5B:
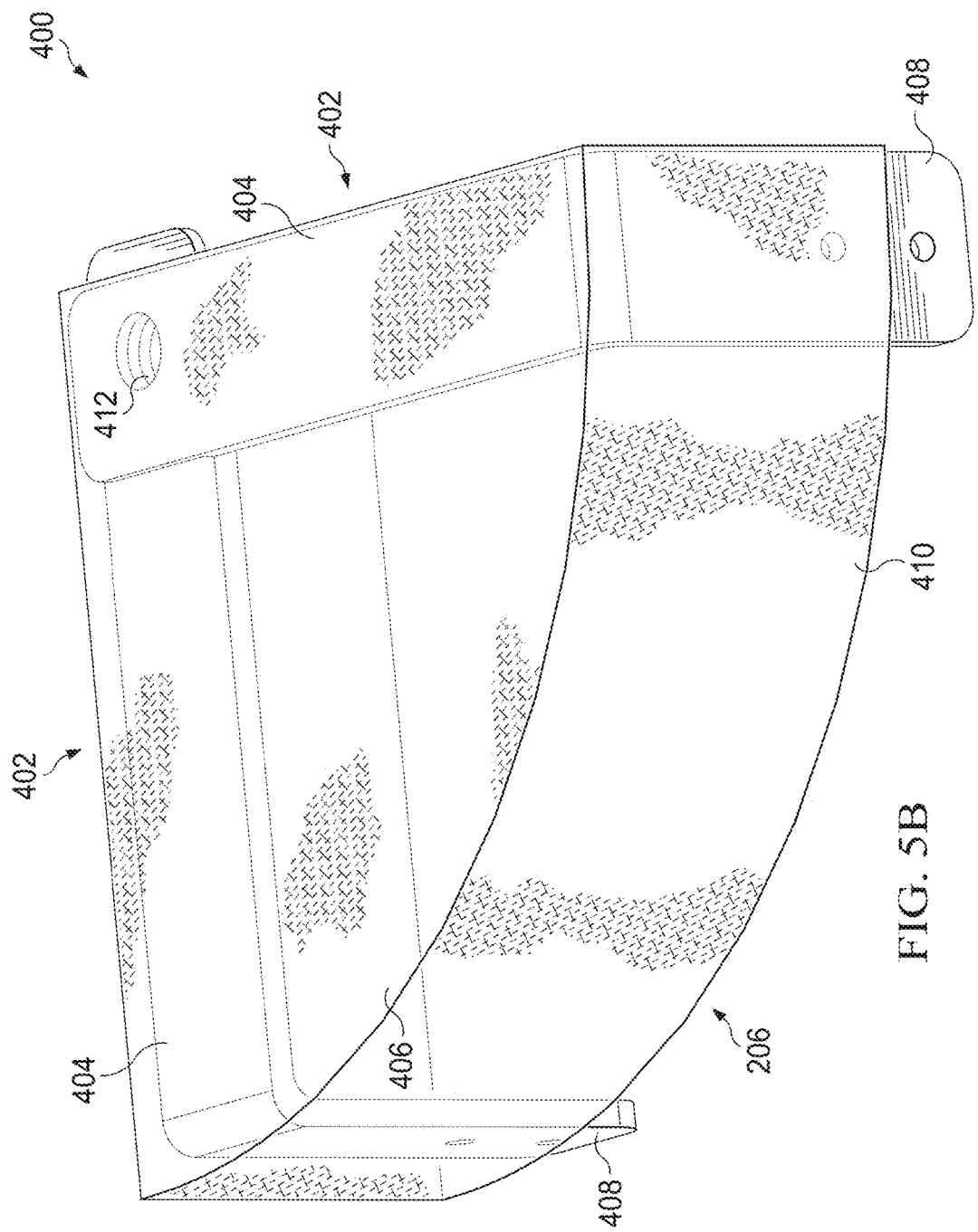
FIG. 5B is a perspective view of a corner umbrella configured to be supported by support braces in angular abutment.

FIG. 5B illustrates a perspective, view of an alternate embodiment of a corner umbrella 400 of the low-profile snake barrier 200. The corner umbrella 400 may be preassembled with screen/mesh material 206 and secured to a pair of support braces 208 that are in angular, including orthogonal, abutment with each other. The corner umbrella 400 may overlap with the screen/mesh material 206 of an adjacent section of the snake barrier 200, so as not to create any gaps in the barrier 200 through which a snake could breach the barrier 200. The corner umbrella 400 includes a pair of umbrella support braces 402. A corner overhang support portion 404 of an umbrella support brace 402 supports an overhang portion 406 of the corner umbrella 400, and a corner skirt support portion 408 of the brace 402 supports a corner skirt portion 410 of the umbrella 400. The screen/mesh material 206 may be secured to the corner overhang support portion 404 and the corner skirt support portion 408 using any suitable fastener, such as the rivets described above with respect to FIGS. 3A and 3B. Each of the umbrella support braces 402 also includes a through hole 412 proximate a vertex of the pair of braces 400. The stake 240 is received through the two through holes 412 and through an angular abutment bracket 244 or an orthogonal abutment bracket 260. In this manner, the umbrella support braces 402 can rest on and partially cover the overhang support members 230 and the skirt support members 232 of the support braces 208. The corner umbrella 400 may be configured at any suitable angle formed by the two umbrella support braces 402 with the through hole 412 proximate the vertex. For example, the angle may be in the range of 30 degrees to 170 degrees. An approximately 90 degree angle is shown in FIG. 5B. The corner umbrella 400 is easily removable from the abutted braces 208.

Figure 6:
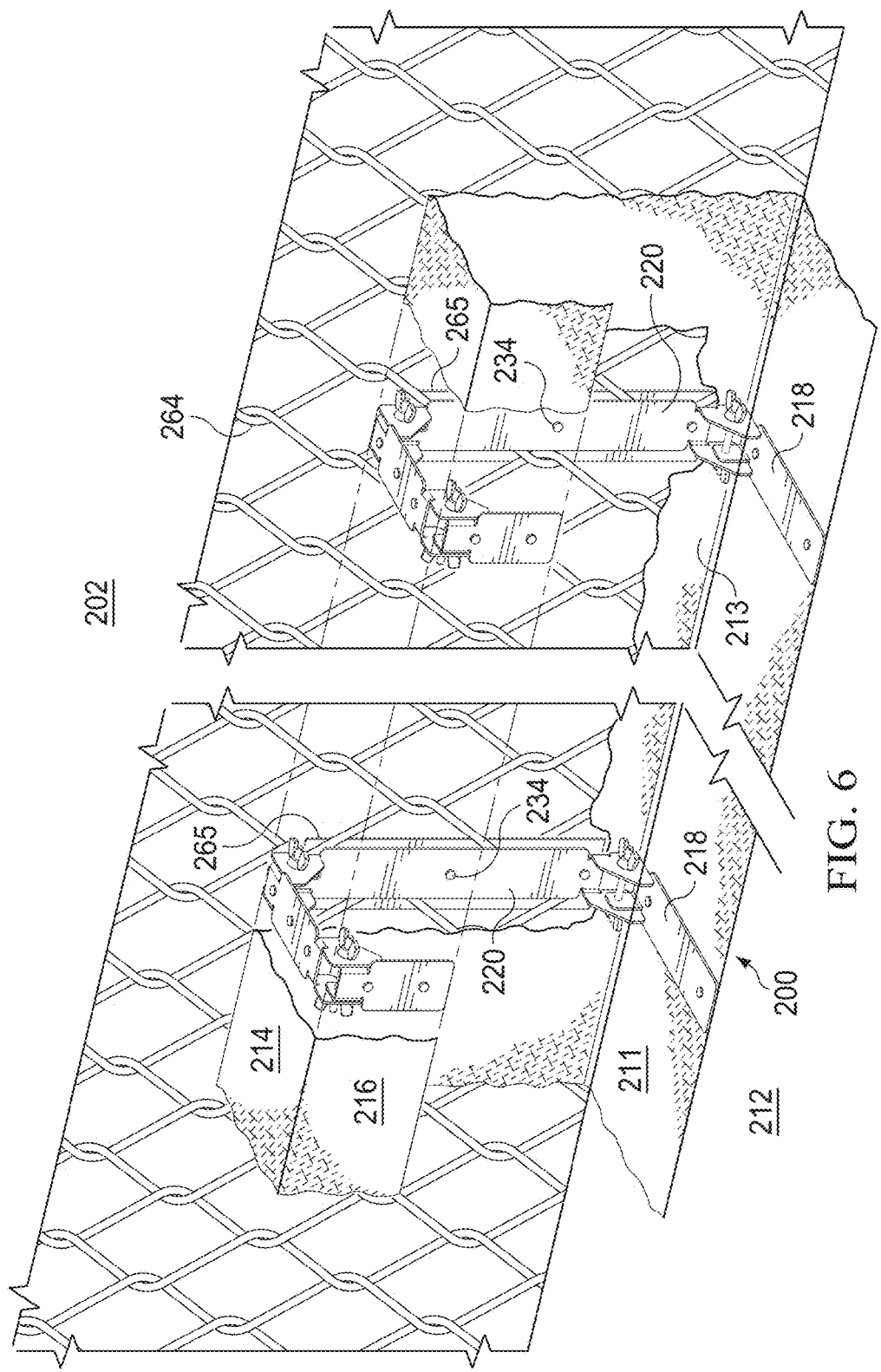
FIG. 6 is a perspective view of a section of the low-profile snake barrier secured to a chain-link fence.

Reference is now made to FIG. 6, which illustrates an embodiment of a section of the low-profile snake barrier 200 secured to a chain-link fence 264. In certain applications, it may be desirable to prevent snakes from breaching a chain-link fence, which is not designed to prevent snake ingress because the chain-link fence includes openings large enough for a snake to fit through. In this embodiment, the section of the low-profile snake barrier 200 is abutted to the fence 264 such that the upright portion 213 of the screen blocks the openings in the fence 264 where the snake would otherwise be able to slither through. The section of the low-profile snake barrier 200 may be erected abutted to the fence and may optionally be secured to the fence 264. For example, a fence coupling bracket 265 is positioned on the opposite side of the fence 264 from the snake barrier 200. By joining the fence coupling bracket 265 to a vertical member 220 of the support braces 208, the low-profile snake barrier 200 is secured to the fence 264 such that the fence 264 provides additional support for that section of the snake barrier 200, and the fence 264 is reinforced such that snakes can no longer breach the fence. A section of the snake barrier 200 may be abutted to and/or secured to other types of fences as well, such as wrought iron fences, wire fences, wooden fences, and the like. Any suitable fastener may be used to secure the section of the low-profile snake barrier 200 to the fence 264. For example, a screw, bolt, or rivet and the like (not shown) may be received through the through hole 234 in the vertical member 220 to secure the support braces 208 to the fence 264.

Figure 7A:
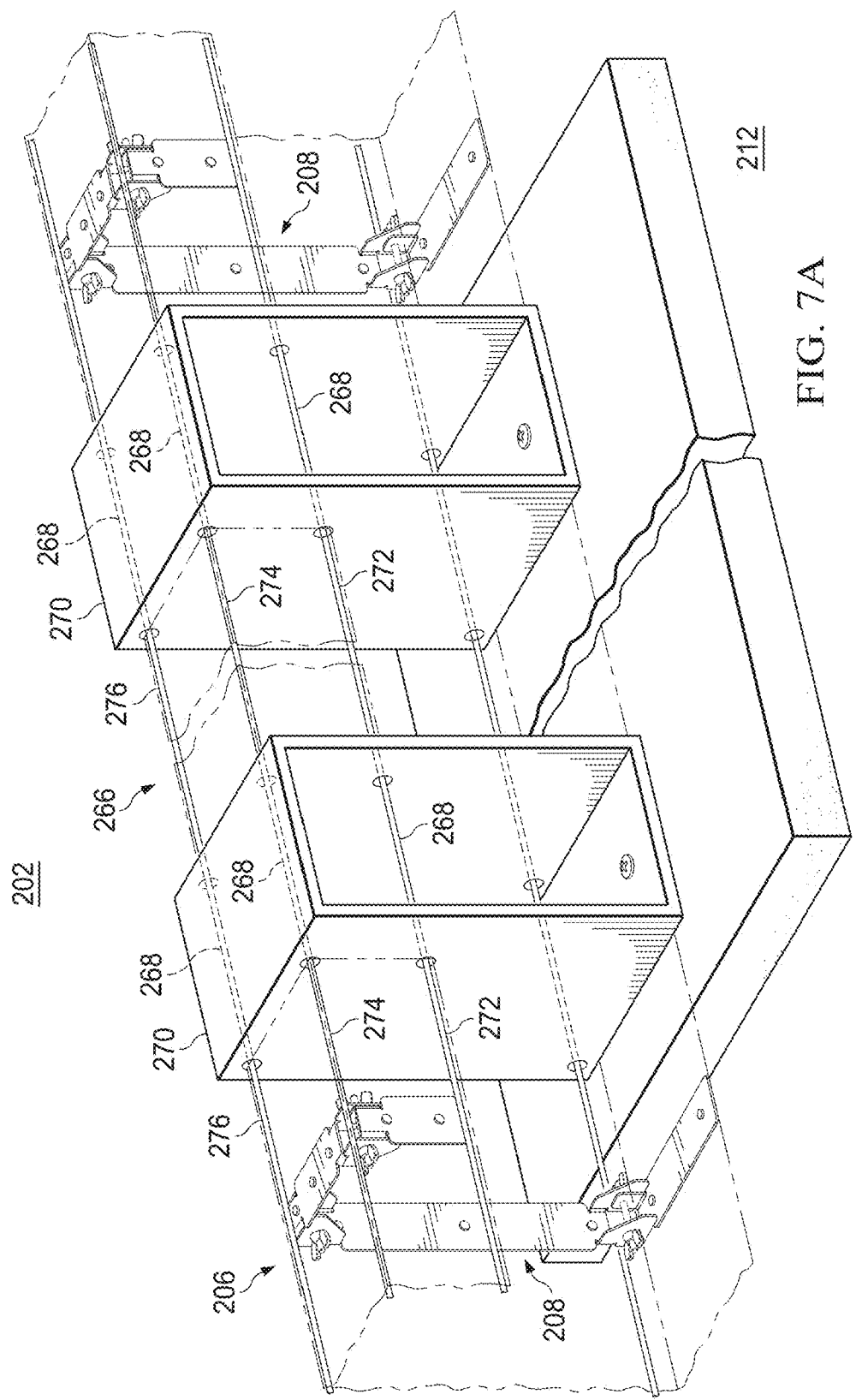
FIGS. 7A and 7B are perspective views of a resilient drive over section of a low-profile snake barrier according to the teachings of the present disclosure.
Figure 7B:
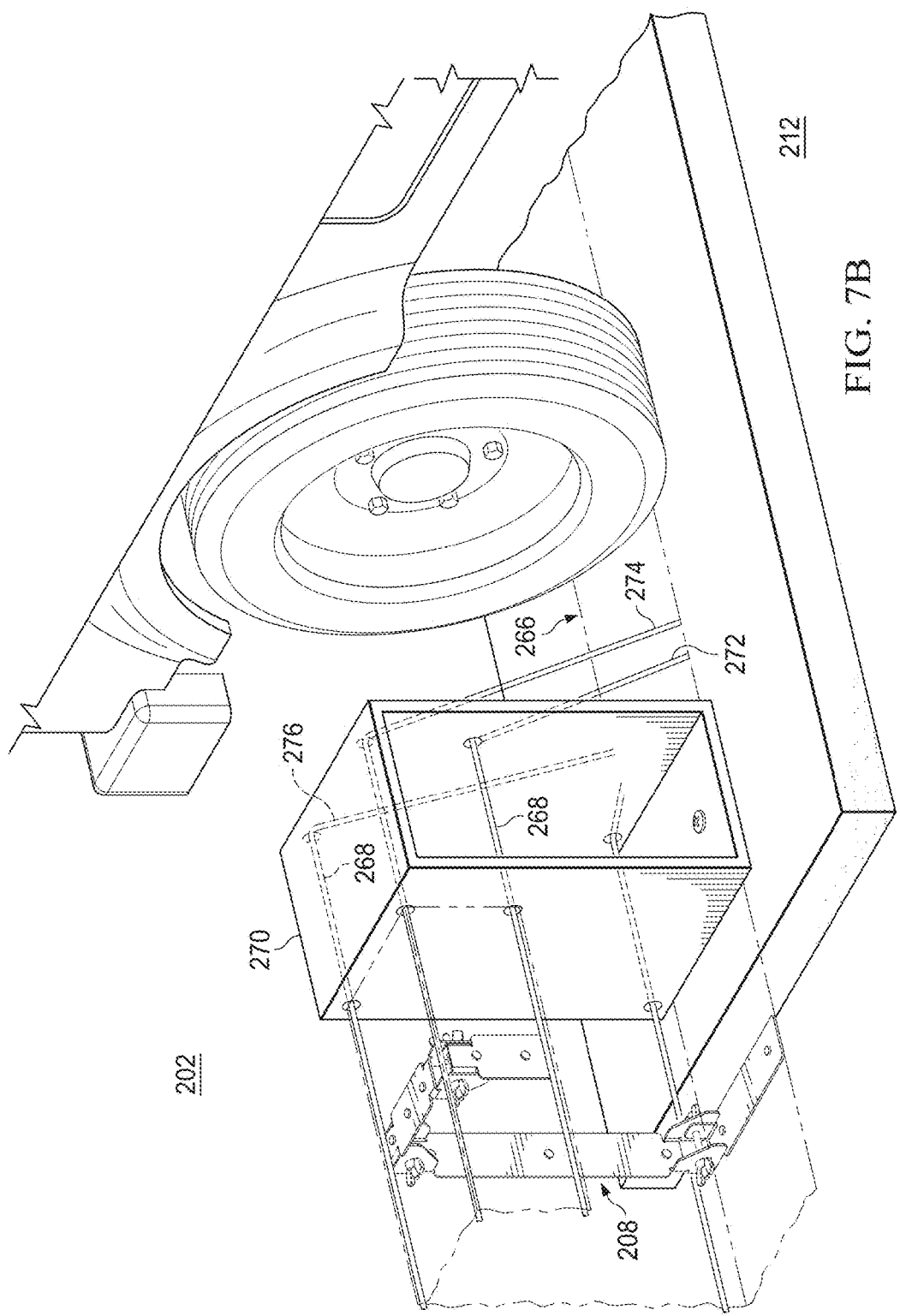

Reference is now made to FIGS. 7A and 7B, which are perspective views of a resilient drive over section 266 of the low-profile snake barrier 200. FIG. 7A shows the resilient drive over section 266 in an upright or erect state, and FIG. 7B shows the resilient drive over section 266 collapsed under the weight of a vehicle where the vehicle's tire is disposed on the drive over section 266. The resilient drive over section 266 includes the portions of the wire mesh or screen 206, as described above. Specifically, the resilient drive over section includes a base portion 211, an upright portion 213, an overhang portion 214, and a skirt portion 216 of the barrier screen. The resilient drive over section 266 differs in that a plurality of elastic cords 268 maintain the erected shape of the resilient drive over section 266.

A drive over section support 270 is disposed at one end, and a second drive over section support 270 is disposed at an opposite end of the resilient drive over section 266. The supports 270 receive ends of the elastic cords 268. For example, an elastic cord 268 is received at one end by a first drive over section support 270 and runs along a skirt edge 272 of the skirt portion 216 and the other end is received by the opposite drive-over section support 270. Similarly, a second elastic cord 268 is received by the pair of drive over section supports 270 and runs along an edge 274 formed at the intersection of the skirt portion 216 and the overhang portion 214. A third elastic cord 268 is likewise supported at its ends by the pair of drive over section supports 270 and runs along an edge 276 formed by the intersection of the upright portion 213 and the overhang portion 214.

A minimal amount of weight sufficient to stretch the elastic cords 268 can roll over the resilient drive over section 266 and collapse the skirt portion 216, the overhang portion 214 and the upright portion 213 of the screen 206, as shown in FIG. 7B, and the cords 268 elastically extend to allow the screen 206 section to collapse. Once the vehicle rolls over the drive over section 266, the elastic cords 268 return to their relaxed state and in so doing erect the low-profile snake barrier resilient drive over section 266 into the erected orientation shown in FIG. 7A where it will function as described above with respect to FIG. 1 to prevent snakes 210 from reaching the protected area 202.

Figure 8:
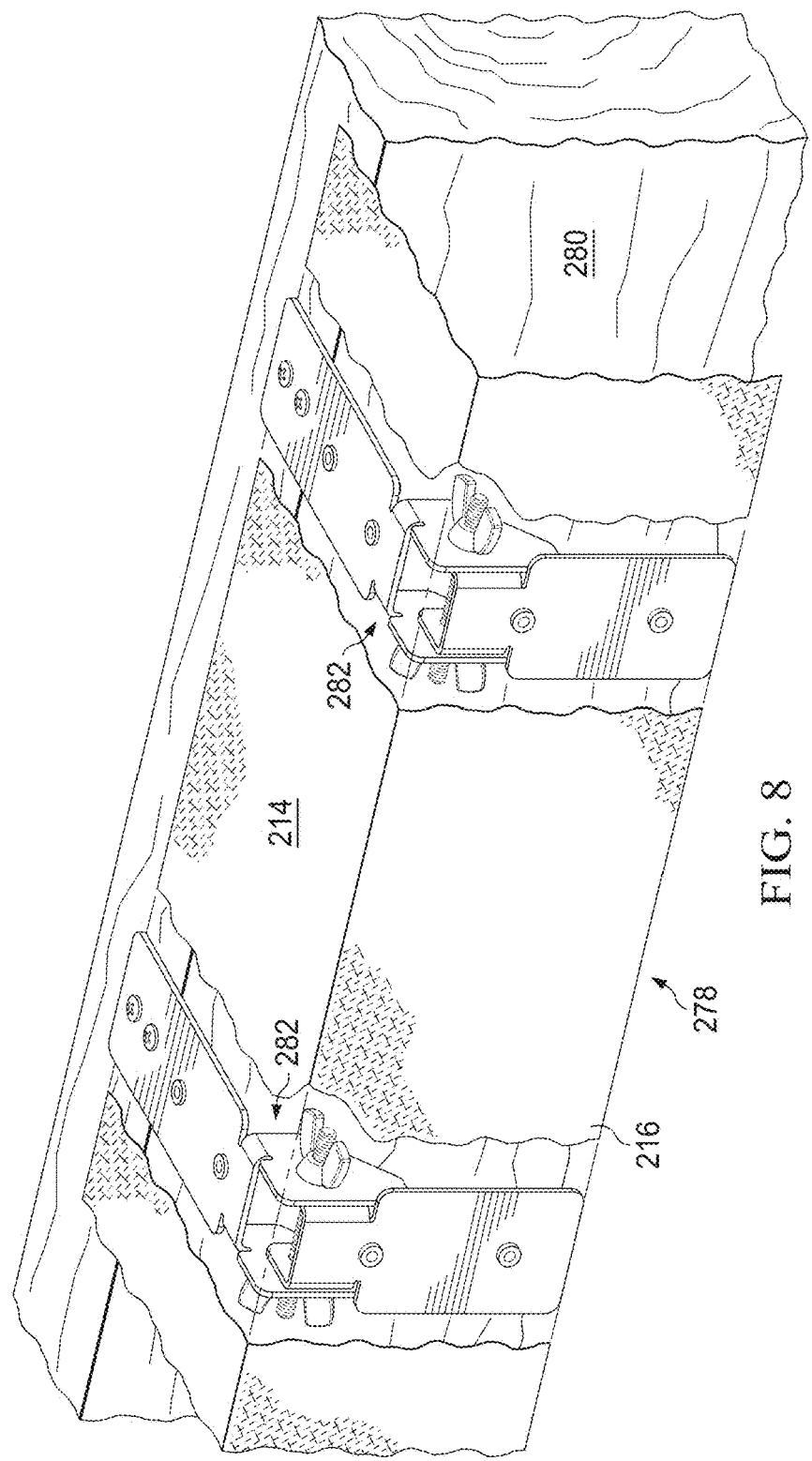
FIG. 8 is a section of a low-profile snake barrier secured to a retaining wall.

Reference is now made to FIG. 8, which shows a retaining wall snake barrier 278. The retaining wall snake barrier 278 is attached to the top of a retaining wall 280. A pair of retaining wall support braces 282 are generally "L" shaped, where a long portion of the "L" supports an overhang portion 214, and a short portion of the "L" supports a skirt portion 216. The braces 282 together with the overhang portion 214 of the screen are secured to the top of the retaining wall 280 when a suitable fastener is received by through holes in the overhang support member of the braces 282. The retaining wall snake barrier 278 functions similar to the stand-alone low-profile snake barrier 200 shown in FIG. 14 where a snake encountering the retaining wall 280 attempts to slither over it and encounters the overhang portion 214 and the skirt portion 216 of the retaining wall snake barrier 278 and is prevented from breaching the retaining wall 280.

Figure 9:
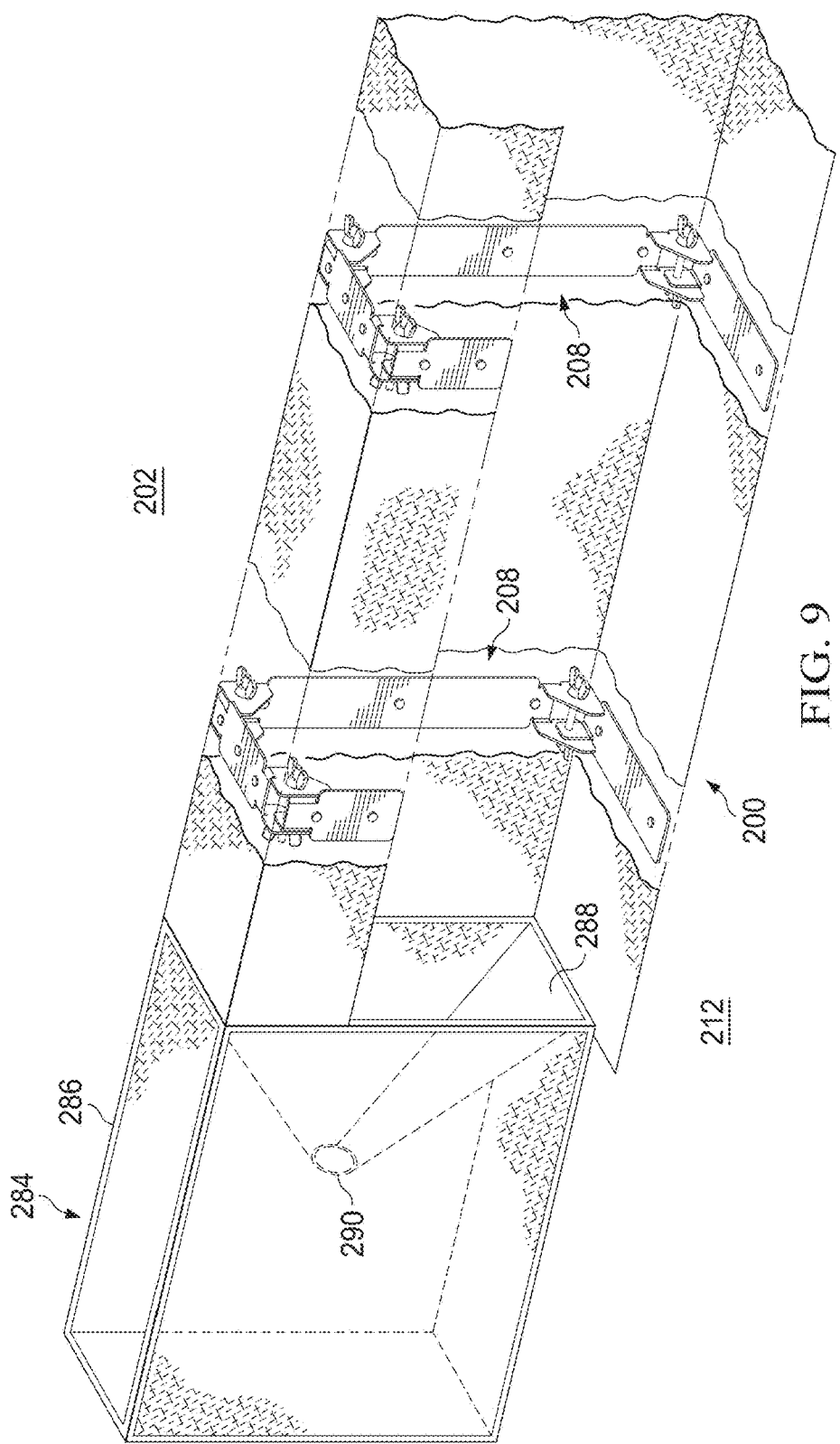
FIG. 9 is a section of a low-profile snake barrier coupled to a snake trap.

FIG. 9 illustrates an embodiment of the low-profile snake barrier 200 that is configured to direct snakes into a snake trap 284 disposed at one or both ends of the snake barrier 200. According to the embodiment illustrated and described above, the snake is prevented from breaching the snake barrier 200 by crawling over it. It is expected that the snake may attempt to follow the snake barrier 200 in an attempt to slither around it. In this case, the snake follows the snake barrier 200 and finds itself caught in a snake trap 284 positioned at one end of the snake barrier 200.

The snake trap 284 includes a generally box-shaped frame 286 that maintains a box-shape for the screen material. One side of the box supports a pyramid-shaped screen 288. A snake slithers through a rectangular opening in the trap and into the pyramid-shaped screen 288. Opposite the pyramid-shaped screen from the rectangular opening is disposed a small circular opening 290. The small circular opening 290 is small enough for the snake to slither through. Once through the small circular opening 290 the snake is trapped in the box portion of the trap 284 because it cannot get back through the small circular opening 290.

Figure 10A:
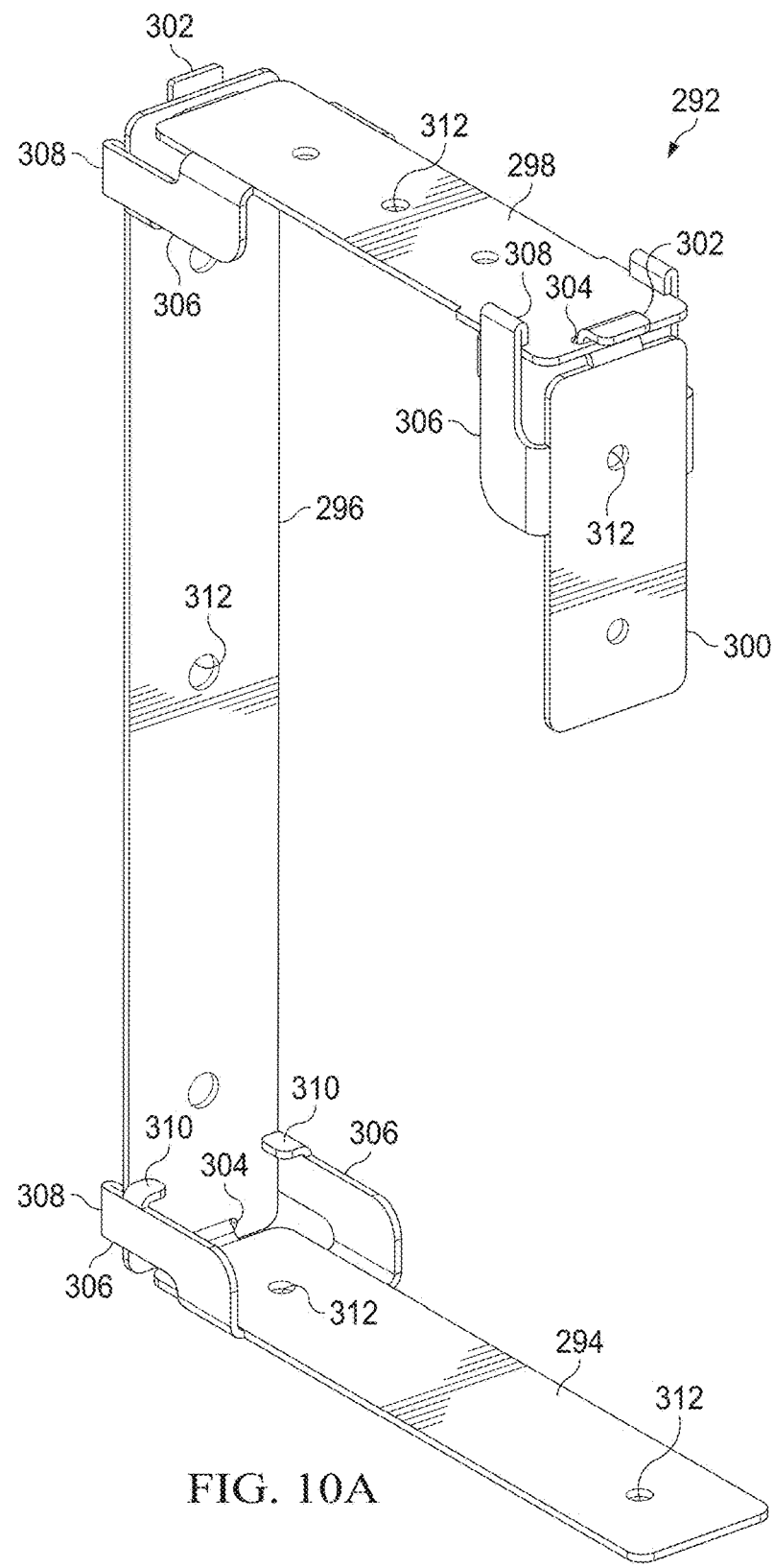
FIG. 10A is a perspective view of an alternate embodiment of a support brace that is adaptable to support an erect configuration of the low-profile snake barrier.
Figure 10B:
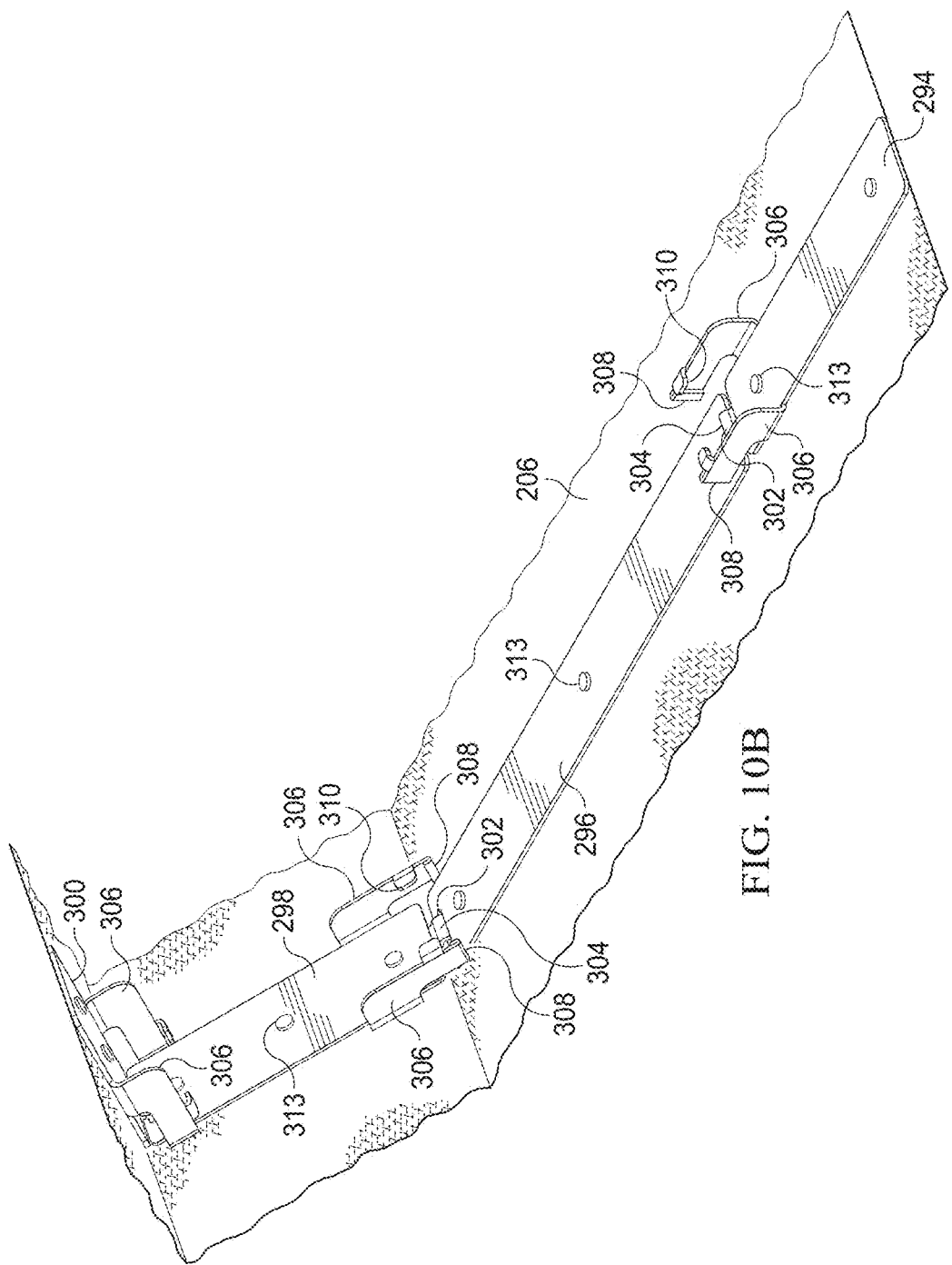
FIG. 10B is a perspective view of the support brace of FIG. 10A in a partially collapsed configuration.

Reference is now made to FIG. 10A, which is a perspective view of an alternate embodiment of a support brace 292. The support brace 292 includes a base member 294, a vertical member 296, an overhang support member 298, and a skirt support member 300. However, in this embodiment, the members are connected to each other when a hook portion 302 is received through a corresponding slot 304 of an adjacent member. FIG. 10B shows the support brace hook/slot embodiment of the support brace 292 in its lay-flat configuration, and FIG. 10A shows the support brace 292 in its erect configuration.

Similar to the support brace embodiment shown in FIGS. 2A and 2B, in the flat position the support brace 292 is easily shipped and stored. In addition, as described further below, positioning support braces 292 in the lay-flat orientation facilitates assembly of the snake barrier 200. In the erected position shown in FIG. 10A, a plurality of support braces 292 maintains the screen material 206 in the barrier configuration shown in FIG. 1.

The base member 294 is pivotably fastened to the vertical member 296. According to the illustrated embodiment, the hook portion 302 extends from an end the base member 294. The hook 302 includes an approximately 90 degree bend that allows the hook 302 to be inserted into a corresponding slot 304 in the vertical member 296 and the hook 302 allows rotation of approximately 90 degrees, which secures the base member 294 to the vertical member 296 in the erect configuration shown in FIG. 10A. This assembly may be accomplished without tools.

A pair of arms 306 extends from each side of the base member 294. Similar to the hook portion 302 the arms include a bend of approximately 90 degrees perpendicular to the base member 294. At an end of the arms 306 and extending beyond the end of the base member 294, a bent end 308 is bent approximately 180 degrees. Also extending from the arm 306 is a tab 310. As shown, the vertical member 296 can be secured between the bent ends 308 and the pair of tabs 310 to maintain the vertical member 296 in the erect and upright orientation shown in FIG. 23A. Once again, this may be accomplished without tools. The connection is sufficient to maintain the erect position of the support brace 292, but may easily be overcome by using hand strength (without tools) to apply force to release the vertical member 296 from its position between the bent ends 308 and the tabs 310.

The overhang support member 298 also includes a slot 304 and at an opposite end a second slot 304 that joins to a hook portion of the overhang support member 298. The overhang support member 298 includes a pair of arms 306 each supporting a bent end 308 and a tab 310 to pivotably secure the overhang support member 298 to the vertical member 296, as described above with respect to the base member 294 and the vertical member 296.

The overhang support member 298 is pivotably coupled to a skirt support member 300 with a slot/hook connection in the manner described above with respect to the coupling of the vertical member 296 to the base member 294.

A section of the snake barrier may be assembled by positioning a support brace 292 in the lay-flat orientation on the screen/mesh material 206. A suitable fastener 313, such as a screw, retainer clip, rivet, and the like, is received through the screen 206 and through at least one through hole 312 formed in the base member 294 where a nut secures the screen 206 to the base member 294. Similarly, the screen 206 is fastened to the skirt support member 300 through the through hole 312 formed in the skirt support member 300. In certain embodiments, the screen 206 may also be attached to the vertical member 296 using at least one through hole 312 in the vertical member 296 and attached to the overhang support member 298 using at least one through hole 312 in the overhang support member 298. Once the screen 206 is secured to a support brace 292, the members of the support brace 292 may be pivoted to place the support brace 292 in the erected position shown in FIG. 10A. By securing the screen mesh material 206 to a plurality of support braces 292 and joining the support braces together as described above with respect to the brace abutments shown in FIGS. 3A-5, a snake barrier, such as the snake barrier 200 shown in FIG. 1 may be erected to create a protected area 202.

Reference is now made to FIG. 11, which is a perspective view of another alternate embodiment of a support brace 314. The support brace 314 is fixed in that it cannot be configured in the lay-flat orientation; rather it is fixed in the erect configuration. A vertical portion 318 is formed/bent approximately 90 degrees from the base portion 316. The support brace 314 may be made of any suitable metal, such as angle iron or steel that can be bent or otherwise formed to the erect configuration shown in FIG. 11. An overhang support portion 320 is bent approximately 90 degrees from the vertical portion 318, and a skirt support portion 322 is bent approximately 90 degrees from the overhang support portion 320. Through holes 324 are formed at spaced-apart locations in each of the base portion 316, the vertical portion 318, the overhang support portion 320, and the skirt support portion 322. As described above, the through holes 324 receive a suitable fastener, such as a screw, bolt, rivet, and the like, to secure the screen 206 to the respective portions of the support brace 314 to form the low-profile snake barrier shown in FIG. 1.

Reference is now made to FIG. 12, which illustrates a low-profile snake barrier 200 that is formed using multiple different support braces 208, 292, and 314 to support the snake barrier in an erect configuration. For example, one, two, or all three different embodiments of the support braces 208, 292, and 314 to create the snake barrier 200. For example, the fixed support brace 314 may hold sections of the snake barrier 200 that are not configured to lay flat to create a drive over segment, while either the nut bolt embodiment of the support brace 208 and/or the slot/hook embodiment 292 of the support brace may be employed to form the sections that are to be temporarily disposed in the lay-flat configuration shown in FIG. 3B. The parallel abutment bracket 236, the adjustable angular abutment bracket 244, and the orthogonal abutment bracket 260 may be used to secure together any of the embodiments of the support braces 208, 292, and 314.

While many of the embodiments of the snake barrier described above are constructed of rigid materials for durability, the snake barrier can be constructed of a mesh galvanized wire having openings smaller than the body of a snake. The mesh wire can be formed in the shape of any of the snake barriers described above to deter upward movement of a snake.

The various embodiments described above can be formed into a perimeter to form an enclosed area that is protected from encroachment by snakes. It should be understood that the individual aspects and features of the various embodiments can be used with any of the disclosed embodiments and should not be construed as being adapted only for the embodiment described therewith.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "clockwise" and "counterclockwise", "left" and "right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A low-profile snake barrier, comprising:
a plurality of barrier sections coupled together to form a boundary;
each barrier section comprising a screen-type material supported by a first support brace at a first end of the barrier section and supported by a second support brace at a second end of the barrier section opposite the first end, the first and second support braces supporting the screen-type material in a collapsed configuration and an erect configuration, the erect configuration comprising an upright portion of the screen-type material extending upward from the ground and an overhang portion of the screen-type material extending from the upright portion and wherein in the collapsed configuration the upright portion and the overhang portion are parallel to the ground; and
wherein each of the first and second support braces comprises a base member pivotably coupled to a vertical member and an overhang support member pivotably coupled to the vertical member, wherein pivoting the base member with respect to the vertical member and pivoting the overhang support member with respect to the vertical member facilitates transformation from the collapsed configuration to the erect configuration.

2. The low-profile snake barrier of claim 1 wherein the plurality of barrier sections comprises a first barrier section and a second barrier section, and further comprising a parallel abutment bracket coupling the first support brace of the first barrier section with the second support brace of the second barrier section.

3. The low-profile snake barrier of claim 1 wherein the plurality of barrier sections comprises a first barrier section and a second barrier section, and further comprising an angular abutment bracket coupling the first support brace of the first barrier section with the second support brace of the second barrier section at an angle.

4. The low-profile snake barrier of claim 3 wherein the angle is either acute or obtuse.

5. The low-profile snake barrier of claim 3 wherein the angle is a right angle.

6. The low-profile snake barrier of claim 3 wherein the angular abutment bracket defines at least one slot that allows adjustment of the angle.

7. The low-profile snake barrier of claim 1 wherein the erect configuration further comprises a base portion of the screen-type material extending from the upright portion and a skirt portion of the screen-type material extending from the overhang portion.

8. The low-profile snake barrier of claim 1 wherein a skirt support member is pivotably coupled to the overhang support member.

9. The low-profile snake barrier of claim 1 wherein the base member comprises a first pair of holed-tabs and the vertical member comprises a second pair of holed-tabs, the base member being pivotably coupled to the vertical member via a rod received through the first and second pairs of holed-tabs.

10. The low-profile snake barrier of claim 1 wherein the base member comprises a hook portion and the vertical member defines a slot and wherein the slot receiving the hook portion pivotably couples the base member to the vertical member.

11. The low-profile snake barrier of claim 1 wherein a first barrier section of the plurality of barrier sections is coupled to a snake trap.

12. A barrier section of a low-profile snake barrier, comprising:
a screen-type material supported by a first support brace at a first end and a second support brace at a second end opposite the first end, the first and second support braces supporting the screen-type material in a collapsed configuration and an erect configuration, the erect configuration comprising a base portion of the screen-type material, an upright portion of the screen-type material extending upward from the base portion, an overhang portion of the screen-type material extending from the upright portion, and a skirt portion of the screen-type material extending from the overhang portion, and wherein in the collapsed configuration the base portion, the upright portion, the overhang portion, and the skirt portion are disposed parallel to the ground; and
wherein each of the first and second support braces comprises a base member pivotably coupled to a vertical member, an overhang support member pivotably coupled to the vertical member, and a skirt support member pivotably coupled to the overhang support member and wherein pivoting the vertical member with respect to the base member and pivoting the overhang support member with respect to the vertical member and the skirt support member with respect to the overhang support member facilitates transformation from the collapsed configuration to the erect configuration.

13. The barrier section of claim 12 wherein a third support brace is coupled to the first support brace using at least one parallel abutment bracket.

14. The barrier section of claim 12 wherein a third support brace is coupled to the first support brace at an angle using an angular abutment bracket.

15. The barrier section of claim 12 wherein a third support brace is coupled to the first support brace, the third support brace being fixed and comprising a base portion, a vertical portion orthogonally bent with respect to the base portion, an overhang support portion orthogonally bent with respect to the vertical portion, and a skirt support portion orthogonally bent with respect to the overhang support portion.

16. The barrier section of claim 12 wherein the vertical member comprises a first pair of holed-tabs and the overhang support member comprises a second pair of holed-tabs, the vertical member being pivotably coupled to the overhang member via a rod received through the first and second pairs of holed-tabs.

17. The barrier section of claim 12 wherein the vertical member comprises a hook portion and the overhang support member defines a slot and wherein the slot receiving the hook portion pivotably couples the vertical member to the overhang support member.

18. A low-profile snake barrier, comprising:
a first barrier section coupled to a second barrier section;
each barrier section comprising a screen-type material supported by a first support brace at a first end of the barrier section and supported by a second support brace at a second end of the barrier section opposite the first end, the first and second support braces supporting the screen-type material in a collapsed configuration and an erect configuration, the erect configuration comprising an upright portion of the screen-type material extending upward from the ground and an overhang portion of the screen-type material extending from the upright portion and wherein in the collapsed configuration the upright portion and the overhang portion are parallel to the ground;
an angular abutment bracket coupling the first support brace of the first barrier section with the second support brace of the second barrier section at an angle; and
wherein each of the first and second support braces comprises a first member and a second member, the first member comprising a first pair of holed-tabs and the second member comprising a second pair of holed-tabs, the first member being pivotably coupled to the second member via a rod received through the first and second pairs of holed-tabs and pivoting the first member with respect to the second member facilitates transformation from the collapsed configuration to the erect configuration.

19. The low-profile snake barrier of claim 18 further comprising a corner umbrella disposed between the first barrier section and the second barrier section, the corner umbrella comprising a pair of umbrella support braces supporting a corner overhang portion and a corner skirt portion.

20. The low-profile snake barrier of claim 19 wherein each of the umbrella support braces includes a through hole proximate a vertex formed by the pair of umbrella support braces.

21. The low-profile snake barrier of claim 18 wherein the screen-type material comprises vinyl coated polyester screen material.

* * * * *